United States Patent Office 2,810,629
Patented Oct. 22, 1957

2,810,629

PROCESS FOR THE PREPARATION OF PHOSPHORUS PENTAFLUORIDE

Earl Leonard Muetterties, Chadds Ford, Pa., assignor to E. I. du Pont de Nemours and Company, Wilmington, Del., a corporation of Delaware No Drawing. Application October 19, 1955, Serial No. 541,545

3 Claims. (Cl. 23—205)

This invention relates to a new method of preparing phosphorus pentafluoride.

Phosphorus pentafluoride has recently acquired considerable technical importance because of the discovery (U. S. Patent 2,709,186) that it reacts with carbon at high temperatures to give the extremely valuable tetrafluoroethylene in good yields. Phosphorus pentafluoride can be prepared by the method described and claimed in application Serial No. 334,967, filed on February 3, 1953, by E. L. Muetterties, wherein phosphorus pentachloride is reacted with calcium fluoride heated to at least 300° C. This method is not entirely without disadvantages since it requires the use of phosphorus pentachloride, a sublimable solid that is difficult to meter and feed and tends to plug narrow passages, exit lines, etc.

Phosphorus trifluoride can be converted to phosphorus pentafluoride by treating it with a halogen, such as bromine, to form phosphorus dibromotrifluoride, which on heating decomposes according to the equation $$5PF_3Br_2 \rightarrow 3PF_5 + 2PBr_5$$

However, this method has the disadvantage that only three moles of phosphorus pentafluoride are obtained from five moles of phosphorus trifluoride.

It is an object of the present invention to provide a new process for the preparation of phosphorus pentafluoride. A further object is to provide a one-step process for the preparation of phosphorus pentafluoride in high yields from phosphorus trifluoride utilizing an alkaline earth metal fluoride, particularly calcium fluoride as a source of the fluorine. Other objects will appear hereinafter.

The objects of the present invention are accomplished by a process, which comprises reacting a substantially equimolar mixture of phosphorus trifluoride and a halogen having an atomic number not less than 17 and not more than 35, i. e. chlorine or bromine, with an alkaline earth metal fluoride at a temperature of at least 300° C. and recovering essentially quantitative yields of phosphorus pentafluoride. In a preferred embodiment of the present invention equimolar quantities of phosphorus trifluoride and chlorine are reacted with calcium fluoride at temperatures above 300° C. Chlorine and calcium fluoride are preferred primarily because of their availability and low cost.

Instead of using a mixture of phosphorus trifluoride and chlorine, it is possible to use with equally good results phosphorus dichlorotrifluoride, $PF_3Cl_2$, which, as is known, forms rather readily when the two gases are brought in contact at room temperature. Presumably, mixtures of phosphorus trifluoride and chlorine always contain at least some phosphorus dichlorotrifluoride. There is, however, no special advantage, in the process of the invention, in first forming phosphorus dichlorotrifluoride since this compound is unstable and should be used as soon as it is formed.

In one mode of operation of this invention a cooled corrosion-resistant pressure vessel is charged with an approximately equimolar mixture of chlorine and phosphorus trifluoride (the latter is a gas which can be prepared by reacting phosphorus trichloride with antimony trifluoride) and with an excess of dry, finely divided calcium fluoride. The vessel is then closed and heated with agitation under the autogenous pressure which develops at reaction temperature. Suitable operating conditions are a temperature of 300–500° C. and a reaction time of 1–10 hours. The resulting phosphorus pentafluoride is isolated by bleeding the contents of the reactor into a metal cylinder where it can be stored under pressure, or into a vessel cooled below its boiling point, which is about −85° C.

The invention is illustrated by the following example:

*Example 1.*—A pressure vessel lined with a nickel-iron-molybdenum alloy was cooled in liquid nitrogen and charged with 81.2 g. (0.92 mole) of phosphorus trifluoride, 65.5 g. (0.92 mole) of chlorine and 123 g. (1.6 moles) of dry, finely divided calcium fluoride. The vessel was then sealed and heated with rocking at 350° C. for 8 hours. At the end of this period the vessel was cooled and the gaseous reaction product was released into a dry, evacuated cylinder cooled with liquid nitrogen. There was obtained the theoretical amount (116.5 g.) of phosphorus pentafluoride, which was substantially pure except for a very small amount of chlorine-containing impurity.

While the above example illustrates batch operation, it is, of course, possible to operate the process in a continuous or semicontinuous manner, for example, by passing a mixture of phosphorus trifluoride and chlorine, or preformed phosphorus dichlorotrifluoride, or equilibrium mixtures of these reactants, over calcium fluoride maintained at a temperature exceeding 300° C. at atmospheric or near atmospheric pressure, continuously separating the phosphorus pentafluoride formed and recycling the gaseous reactants.

It is desirable that the phosphorus trifluoride and the chlorine be used in substantially equimolar quantities, although a slight excess, e. g., a 10% molar excess of one or the other can be tolerated. The calcium fluoride can be used in stoichiometric amounts but is preferably used in excess, e. g., from 1.1 to 3 times the calculated quantity.

The reaction is preferably conducted at temperatures in the range of 300° to 500° C., the best results being obtained within the temperature range of 325 to 500° C. The reaction time is not critical, since substantial conversions are obtained in short times at the preferred operating temperature. Thus, in batchwise operation a contact time of 10–30 minutes above 300° C. is sufficient to produce practical yields. The contact time can be much longer, e. g., up to 10 hours or more, and is preferably 1–3 hours. In continuous operation, the contact time may be, for example, as low as 5 seconds with recycling of the gaseous reactants. It is, of course, essential that the operation be carried out under essentially anhydrous conditions and with essentially anhydrous reactants.

In practice, for example in the synthesis of tetrafluoroethylene wherein phosphorus pentafluoride is converted to tetrafluoroethylene and phosphorus trifluoride, as disclosed in co-pending application Serial No. 510,636, filed by Dennison et al., on May 24, 1955, it is sometimes desirable to combine the process of reconverting phosphorus trifluoride to the pentafluoride with the process of making additional phosphorus pentafluoride from phosphorus pentachloride. This is for the reason that some loss is bound to occur during the cycle $PF_5$—$PF_3$—$PF_5$. This can be done simply by adding the desired amount of phosphorus pentachloride, with a corresponding amount of calcium fluoride, to the reactants used in the process of this invention and proceeding in the same manner.

The process of the present invention has been primarily described with respect to chlorine and calcium fluoride.

Instead of the chlorine, bromine which is essentially equivalent, may be used. Similarly instead of calcium fluoride, other alkaline earth metal fluorides can be used, such as barium fluoride, strontium fluoride, magnesium fluoride, and beryllium fluoride. While these materials are substantially equivalent to calcium fluoride from the technical standpoint, calcium fluoride is by far the most abundant and cheapest of the operable fluorides, and it is therefore much preferred over the others.

The phosphorus pentafluoride produced according to this invention is generally obtained in a state of purity quite sufficient for most uses. If desired, it can be purified by fractionation in a low temperature, high pressure still, an operation which presents no difficulties in view of the fairly large differences in boiling points between phosphorus pentafluoride ($-85°$ C.) and the principal possible contaminants, phosphorus trifluoride ($-101°$ C.) and chlorine ($-35°$ C.).

This invention affords a simple process of synthesizing, in very high yields, phosphorus pentafluoride from reactants, of which two are easily handleable gases and the third is the very cheap calcium fluoride.

I claim:

1. A process for the preparation of phosphorus pentafluoride, which comprises reacting under essentially anhydrous conditions a mixture of phosphorus trifluoride and a halogen of the class consisting of chlorine and bromine with an alkaline earth metal fluoride at a temperature of at least 300° C.

2. A process for the preparation of phosphorus pentafluoride, which comprises reacting under essentially anhydrous conditions an equimolar mixture of phosphorus trifluoride and a halogen of the class consisting of chlorine and bromine with an alkaline earth metal fluoride at a temperature of 300° C. to 500° C.

3. A process for the preparation of phosphorus pentafluoride which comprises reacting under essentially anhydrous conditions a mixture of phosphorus trifluoride and chlorine with calcium fluoride at a temperature of 300° C. to 500° C.

References Cited in the file of this patent

FOREIGN PATENTS 814,139   Germany _____ Sept. 20, 1951

OTHER REFERENCES

Mellor: "Comprehensive Treatise on Inorganic and Theoretical Chemistry" (1928), vol. 8, page 1015.